Oct. 8, 1963   R. M. BRICK ETAL   3,106,014
PRODUCTION OF LAMINATE COMPOSITE MATERIAL
BY ROLL BONDING PROCEDURES
Filed Feb. 18, 1959   2 Sheets-Sheet 1

Robert M. Brick
Curtis E. Maier
INVENTORS

BY *Mason, Porter, Diehl & Stewart*

ATTORNEYS

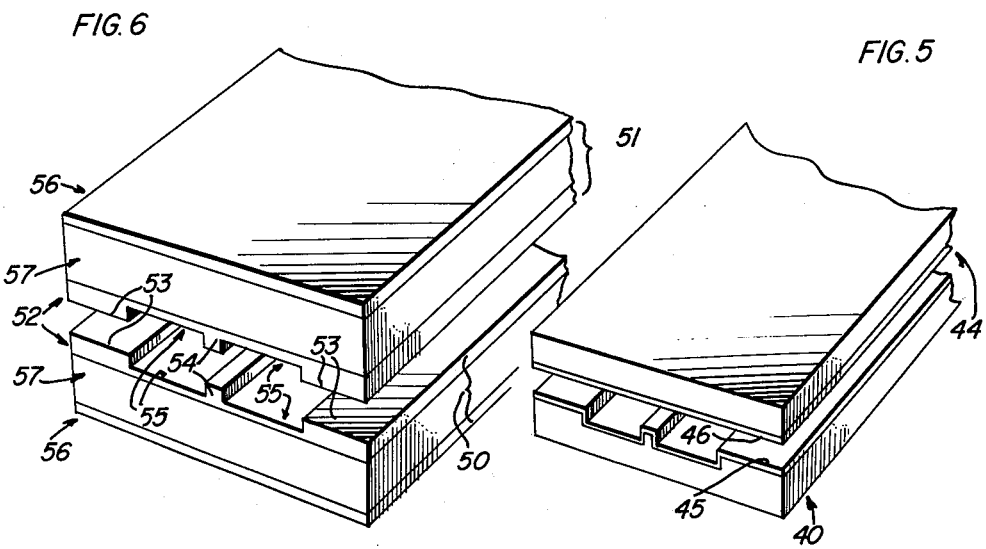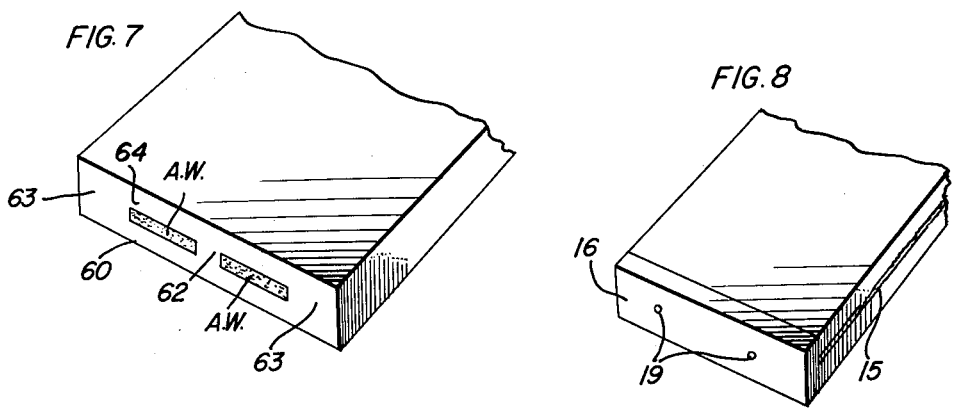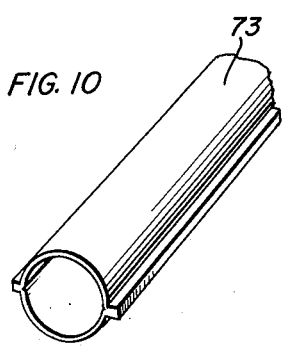

3,106,014
PRODUCTION OF LAMINATE COMPOSITE MATERIAL BY ROLL BONDING PROCEDURES
Robert M. Brick, Hinsdale, and Curtis E. Maier, Riverside, Ill., assignors to Continental Can Company, Inc., New York, N.Y., a corporation of New York
Filed Feb. 18, 1959, Ser. No. 794,119
7 Claims. (Cl. 29—470.9)

This invention is concerned with a production of composite laminate stock, that is, a laminate structure having within the body discontinuities of which the surface portions which are prevented from welding together and having other portions at which welding is accomplished.

An object of the invention is the provision of such a laminate stock at which the non-welding regions are closely controlled as to their widths and lengths, and their spacings from the edges of the stock and from one another.

Another object is the making of such a stock under conditions to prevent shifting and lateral spreading of an included anti-welding material during the course of operations.

Another object is the provision of a billet including enclosed discontinuities containing weld-preventing or resist material of high density and regularity.

A further object is the provision of a laminate stock of multiple layers including cladding material presented adjacent the anti-welding material so that upon opening of the stock into a tubular form the hollow space of a tubing is protected by cladding material.

A further object is the provision of stock layers having surfaces cooperating to provide welded areas and to provide channels for anti-welding material.

A further object is the provision of initial layers having coatings thereon for facilitating welding at desired areas.

A further object is the provision of initial layers for incorporation into a laminate stock, these layers having portions with coatings which facilitate the later operations of reduction to a desired dimension of thickness.

With these and other objects as features in mind, illustrative practices of the invention are shown on the accompanying drawings in which:

FIGURE 5 is a view corresponding to FIGURE 1, showing the provision of a cladding material as a thin coating.

FIGURE 6 is a view corresponding to FIGURE 2, and illustrating a second form of providing cladding material.

FIGURE 7 is a perspective view of the laminate stock after welding.

FIGURE 8 is a perspective view showing an end seal applied.

FIGURE 10 is a perspective view of a tube formed from the stock of FIGURE 9.

It is known to make a composite laminate stock by coating defined areas of a metal sheet with an anti-welding substance, for example, by printing such areas with an ink containing an anti-welding powder and a fluid binder; then to place a second sheet upon the first, and pass the assembly through rolls for effecting welding at the non-coated areas. It is likewise known to provide a billet with internal channels filled with anti-welding powder either by casting metal as an ingot around cores made of the powder in bonded form, or by drilling holes in a billet and filling these holes with the powdery anti-welding material. Such assembled plates or billets are then further rolled to attain a desired final thickness, wherewith the anti-welding material prevents welding over the areas or regions occupied by it, and itself yields in proportion to the yielding of the body metal.

With these known procedures, however, any displacement of the anti-welding material from intended position results in inaccuracy of the edges of the bonded areas, so that when the laminate stock is opened out to form a tubing, the internal hollows are not rectilinear. In addition, the migrating anti-weld powder may pass into areas where welding is necessary for strength, and thus produce a weak tubing.

According to the present invention, these difficulties are obviated by providing defined areas for reception of the anti-welding material, and thereby assuring accuracy in its location, both during the initial welding and during the later rolling to final thickness. Thereby it is feasible to effect a joining of the layers for closely controlled predetermined areas of definite location and width, with intervals between the bonding areas which likewise are of definite location and width.

Figure 1:
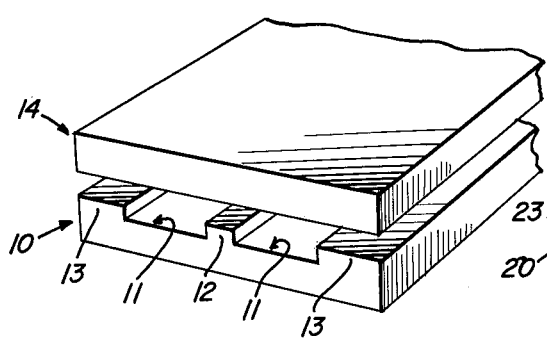
FIGURE 1 is a perspective view of portions of initial layers of material which are to be joined for forming a laminate stock.

As shown in FIGURE 1, a bottom slab 10 is made with one or more longitudinal grooves or channels 11 separated by intervening ribs or lands 12 and having marginal ribs or lands 13. Such slabs can be prepared directly by extrusion, e.g. if made of aluminum; by hot rolling, e.g. if made of steel or like material; by machining; or by other methods appropriate to the material which is to form the major portion of the body structure. The depth of the channels is determined by the thickness of anti-welding material which is to be present initially and must be effective during the later reduction to the predetermined final thickness. Preferably the channels are about 0.010 inch deeper than the intended thickness of the cores of anti-welding material. In FIGURE 1, these lands 12, 13 are flat on top, so that they abut over their areas with the top slab 14. The slabs 10, 14 can be 1½ inches thick at the channels 11; and may have desired cross-sections, a generally rectangular form being illustrated. It is preferred to provide for the escape of the air which occupies space between the powder particles, during heating and rolling: e.g. the welding of the end plates 16 need not be complete, or vent holes 19 may be provided in one or both plates, noting that the escape should be permitted at the end of the ingot which last passes the reducing rolls. The slabs 10, 14 are shown as of the same width: when brought flatwise together, their edges can be temporarily joined by torch or arc welding, e.g. as shown by the seam 15 to prevent later relative displacement. The channels 11 can then be filled with anti-welding powder; noting that one end can be sealed by crimping or by welding an end closure plate 16 (FIG. 8) in position, whereby to prevent excessive leakage at one end while filling is being accomplished at the other end, with such other end then being closed in like fashion. The end which enters the roller rigs is preferably sealed; while the trailing end may have vents for the escape of air. This assembly is then heated and hot-rolled, with a first reduction preferably being over 30 percent in thickness, so that the lands of slab 10 are welded over their entire top areas to the slab 14, thereby capsuling and enclosing the anti-welding material within the channel spaces which can be filled therewith: and subsequent reductions as needed to attain the desired final thickness.

It is preferred to place the anti-welding material in the channels 11 before the upper slab is applied. Also the preferred manner of introducing the material is to suspend it in a volatile liquid vehicle, evaporating the vehicle, and baking the deposited mass, before bringing the second slab in position.

Figure 2:
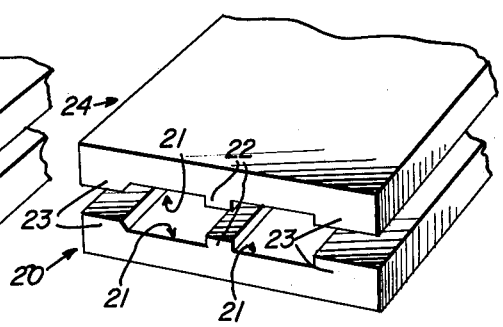
FIGURE 2 is a corresponding view showing another form of initial layers.

This procedure may be modified, as shown by FIGURE 2, in that the top and bottom slabs 20, 24 both have the alined ribs or lands 22, 23 with the channels 21. The slabs can be preliminarily joined as in FIGURE 8, filled end-sealed and rolled as before so that the tops of the lands weld together: and the assembly can then be further rolled if the desired final over-all thickness is less than that produced by the first reduction.

With the form of FIGURE 1, the intermediate lands 12 should have a height:width ratio of 2:1 or less, to restrict the possibility of buckling during the first reduction. In the form of FIGURE 2, where the total height is divided between the upper and lower slabs, the ratio can be made 1½:1 or less.

Figure 3:
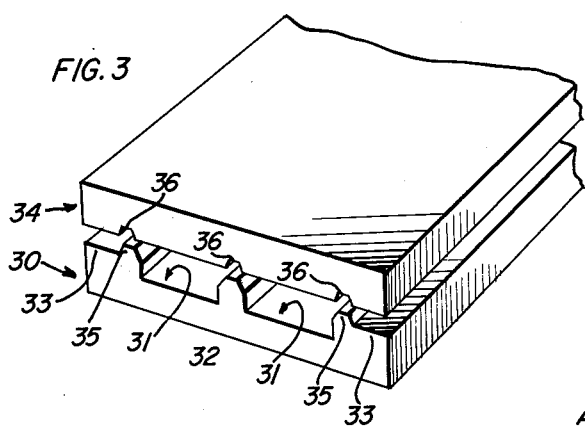
FIGURE 3 is a corresponding view, showing another form of practice.

In FIGURE 3, the occlusion of the channels is assisted by having the bottom slab 30 with marginal lands 33, illustratively shown as elevated above the floors of the channels 31 by the intended depth of the anti-welding deposit; with the lands 32 between the channels 11 being of greater height above the floors of these channels than the intended depth of the weld-preventing material; and with narrow lands 35 likewise projecting above the levels of the flat lands 33. These lands 32, 35 have slanting sides. The top slab 34 has the longitudinal grooves 36 for closely receiving the alined lands 32, 35 to provide a tight fitting against migration of anti-welding material. These grooves 36 have slanting sides for closely receiving the lands 32, 35 during initial assembly, and for abutment contact therewith during the reduction rolling. In the illustrative form, the tops of the lands 32, 35 are flat and lie in a single plane; and the grooves 36 are of depth for closely receiving the respective lands. During the rolling, the forces being exerted between the outer surfaces of the assembly effect roll-welding between the illustrative flat tops of the lands 32, 33, 35 respectively with the conforming surfaces of the upper slab, at the bottoms of the grooves 36 and in abutment with the lands 33; and therewith also there is a direct contact of the slanting sides of the lands 32, 35 in their grooves 36 so that the forces produce welding therebetween. In this practice, the interfitting, and welding as shown by FIGURE 4, prevents migration of the anti-weld material onto the top areas of the lands and into otherwise existing crevices between the lands and groove walls.

The process is preferably practiced by depositing the anti-welding material in the channels before the assembly and welding. This procedure, with the forms of FIGURES 1, 2 and 3 can be practiced by employing a slurry of the anti-welding substance in a vehicle such as water. The ends of the channels are dammed, and the slurry poured in. The vehicle is expelled by drying, noting that a large area is presented for its escape. The slurry provides a smooth upper surface for the deposit.

The filled slab can then be cleaned at its land surfaces to assure welding without particles between the abutting surfaces. It is also feasible to employ a cutting tool, such as a revolving milling cutter to dress the dried deposit and the lands to the desired depths. A bonding material can also be mixed with the anti-welding material, for assuring adhesion of the particles to the slab and to one another; and the drying of a slurry may be conducted to promote the bonding effect. The anti-welding material can also be premolded, with trimming to closely fit the channels, with inclusion of a bonding material for holding the particles locally together. The top slab 14 or 24 is positioned. The slabs are given a preliminary edge welding, and then are rolled to effect welding at the lands. When a powdery anti-welding material is used, the initial stock layers as in FIGURE 3 are preferred to those of FIGURES 1 and 2, because the height of the smoothed material is below the aforesaid top plane.

Figure 4:
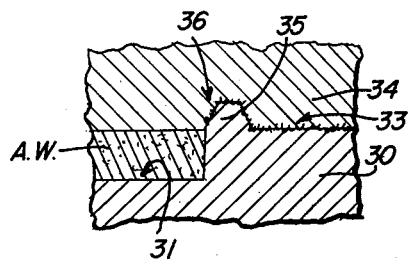
FIGURE 4 is a fragmentary cross-section on an enlarged scale, showing the laminate stock after assembly welding.

Thereafter, when the roll-welding has been effected, the laminate stock appears in cross-section as shown in FIGURE 4, where the areas of lands 35, 33 which are in contact with the top slab 34 are welded thereto, as indicated by the double hatching at the interfaces; and a tight chamber is provided at channel 31 for encapsuling the anti-weld material AW.

In lieu of pre-joining by edge seams 15, of FIG. 8, the initial stock layers may be made as in FIGURES 1, 2 and 3 and then joined by pre-bonding at the land areas. Static prebonding may be effected (a) use of a solder to wet the lands, followed by heat and slight pressure to sweat the two slabs together, noting that where the laminate body material is an aluminum alloy, the solder preferably has a zinc base; (b) use of a brazing compound placed on the lands followed by heating of the two slabs, with slight pressure, to above the melting point of the brazing material; (c) a bond promoting agent, such as silicon powder, is dispersed in a vehicle and painted on the lands to assure better roll bonding on subsequent hot rolling after volatilization of the vehicle.

The initial layers or slabs of the body stock material need not be homogeneous. The slabs 40, 44 may be individually electroplated, as shown by FIGURE 5, to provide thin continuous coatings 45, 46 of a cladding material. For examples, chromium plate can be all-over deposited on iron or steel slabs in a desired thickness for establishing the desired cladding coat in the final rolled strip, and then a thin layer of nickel or copper deposited over at the welding area to assure hot bonding of the elements. A nickel plate can be applied, noting that nickel surfaces will hot-bond directly. Minor diffusion, can occur to promote adhesion, but the surfaces presented to the anti-welding or resist material and at the exterior are provided by the cladding metal. The electroplating of cladding material can be confined to the surfaces of the channels in the lower slab, and to the corresponding surfaces of the upper slab, leaving welding areas of the base or body metal. The slabs can then be assembled and rolled as before, with the anti-welding material introduced before or after the union. The normal electroplated structure is destroyed and an alloy created in its place. Thus both nickel and chromium atoms may replace iron atoms in the crystal structure of iron and make the replacement in any proportions. When chromium is used on iron, the body centered cubic structure of alpha iron is preferred, for a wide range of solid state intermiscibility; and with nickel, the face-centered cubic structure of gamma iron is preferred, for a like reason. The depth of the diffusion coating and the compositional gradient therein depend on the thickness of the original electroplate and the time and temperature of deformation. By selection and control of these parameters, it is possible in the case of steel laminate stock, for example, to have a high chromium content, corrosion-resistant surface at the inside, outside, or both of steel tubing made from such laminate stock.

The process may likewise be practiced with composite slabs, as shown in FIGURE 6. The major part of the thicknesses of the body slabs 50, 51 is formed by steel layers 57 illustratively having parallel faces. The inner facings 52 are thinner, and of a different material, such as nickel which is highly corrosion resistant but more expensive. These facings 52 have lands 53, 54 as shown in FIGURE 2 to provide channels 55. Outer facings 56 for example also of nickel, are employed. It will be noted that the facings can be selected, for their function of non-corrosiveness in the example, from ductile materials without major regard to their strength, for the reason that during the rolling and heating operation, an alloy structure results by the diffusion, with increase of strength. The claddings 52 can likewise be chromium or stainless steel, when a welding film of nickel or copper is present between the surfaces to be welded together. When the claddings 56 are of such metals, it is also the practice to interpose a welding film by plating or as a foil. Titanium and other metals and alloys can likewise be used for cladding. Illustratively the total assembly thickness for the billet may be 8 inches, with internal cladding layers of ¼ inch, for example. Upon rolling, the final strip thickness can be about 0.012 inch, with two lamination layers of about 0.006 inch thick separated from one another at each channel by the residue of the anti-welding material. Therewith the total reduction from 8 inches to 0.012 inch is about 640:1, and the cladding layers have been reduced to about 0.00005 inch each, wherewith the more expensive cladding material is economically employed.

As a further example, the body layers 57 are of carbon steel 9 inches thick, the inner facings 52 are ½ inch thick at the floors of the channels 55 with ¼ inch projections at the lands 53, 54 and the outer facings 56 are ½ inch thick. The facings 52, 56 are of 18-8 or Type 304 stainless steel with a thin nickel-electroplate superimposed. Upon assembling and with use of aluminum oxide or equivalent anti-weld compound in the channels as anti-welding material, the composite is hot rolled for roll-bonding, and hot and cold rolling is then employed for reduction to a final thickness of 0.010 inch total. When such a laminate stock is opened out, as described below, the tubing has a total wall thickness of 0.005 inch, with the internal and external surfaces provided by stainless steel fixedly joined to the metal body by diffusion interfaces, and representing about 0.00025 inch thickness at each surface.

In preparing billets by the assemblies of FIGURES 5 and 6, the edges can be connected as before, e.g. by tack welding.

External cladding as at 56, FIG. 6, may be added. With the last example above, top and bottom elements of ¼ inch stainless steel can be added to the pack. The assembly is rolled, with bonding of the five elements, to a final thickness of 0.012 inch. Upon opening out, the tubing has a wall thickness of 0.006 inch, with 0.00025 inch cladding of stainless steel both inside and outside.

Various anti-welding materials may be employed such as the aluminum oxide, chromium oxide and other powders proposed in the art. Other materials useful for anti-welding core purposes are calcined gypsum, zinc oxide, powdered talc and powdered or finely flaked mica. Talc should not be employed with steel which is to be heat-soaked or hot rolled at the usual temperatures of steel: because it decomposes at such temperatures. Graphite can be used, except where it may diffuse into and undesirably change the character of the abutting metal, e.g. with steel and stainless steel, or where its residue may later provide an electrolytic couple. When powders are to be deposited in the channels before assembly, they preferably are deposited as thick slurries in an evaporable liquid, dried, baked, and then cut as necessary to the desired thickness. Such deposits, into accurately pre-formed channels, assures a maximum density and uniformity after drying and the absence of major empty spaces, e.g. adjacent the regions where roll-bonding of metal to metal is accomplished. In practice, slurry deposits exhibit a greater density than powder deposits, even with vibration or jigging, and the preparation of a resist or anti-welding mass in such a pre-formed channel permits a quick drying and expulsion of the volatile vehicle, compared to the difficulties and long times required for drying slurries which have been deposited into closed channels such as those provided in cast ingots.

With these various forms, the product upon roll-bonding has its metal parts welded together and enclosing the space or spaces for anti-welding material as shown by FIGURE 7, in which the lower layer 60 is bonded to the upper layer 64 at the portions 62, 63 provided by the lands of the initial stock elements; and the anti-welding material AW occupies the channel spaces.

As described above, the ends may be closed by the plates 16, FIGURE 8.

Figure 9:
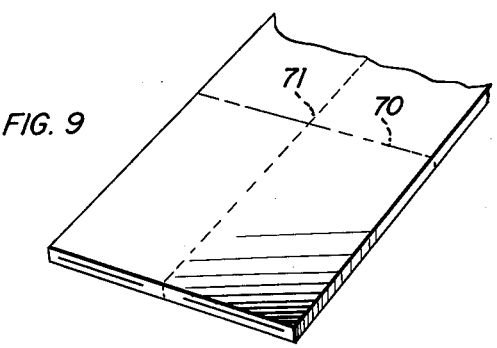
FIGURE 9 is a perspective view of a trimmed portion of a laminate stock after rolling to final thickness.

During rolling to final thickness, the laminate stock is elongated substantially without change of width, with the metal and anti-weld material thicknesses being decreased proportionately to one another, since the anti-welding material elongates and continues its interposition between the metal at the channels, to form a thin strip, FIGURE 9, which is like that of FIGURE 7, except for the reduction of thickness. This strip can then be cut transversely to expose one or both ends, and then the non-welded areas of the upper and lower laminae can be moved apart to form the opened or expanded tubing. In FIGURE 9, the dotted lines 70, 71, show that the strip can be severed transversely and longitudinally to provide short individual blanks which, when opened, become the tubular bodies 73 of FIGURE 10, and can be employed in making containers.

In general, the hot working temperatures for soaking, hot-rolling, and other hot operations referred to above, are as usual based upon the melting point of the material, and not upon the mere presence of a heat condition above room temperature. For example, such operations can be conducted at about two-thirds of the melting point temperature, expressed in degrees absolute.

The invention is not limited to the illustrative practices, and can be employed in many ways within the scope of the appended claims.

We claim:

1. The method of preparing a structure having metal laminations separated by a layer of anti-welding material with the laminations integrally joined metal-to-metal at the edges of said layer, which comprises preparing a first metal slab with a longitudinally extending channel, contact land areas located laterally from the channel with spaces therebetween, and upwardly projecting longitudinal ribs in the spaces between the contact land areas and the channel, the ribs having convergently beveled side surfaces; placing an extensible anti-welding material in the channel with its exposed surface spaced below the plane of the tops of said ribs; preparing a second metal slab with longitudinal grooves conformed in location with the said ribs and having beveled side walls for contacting the sides of the ribs and having contact land areas laterally outside said grooves, bringing the slabs together so that the ribs are received in and fill the grooves and the contact land areas of the slabs are engaged with one another; heating the slabs, and exerting forces upon the outer surfaces of the slabs for effecting welding of the slabs at said contact land areas and between the surfaces of said ribs and grooves.

2. The method of preparing a structure having metal laminations separated by a layer of anti-welding material with the laminations integrally joined metal-to-metal at the edges of said layer, which comprises preparing a first metal slab with a depression and upwardly projecting ribs at margins of the depression and contact land areas laterally outside the ribs, placing an extensible anti-welding material in the depression with its exposed surface spaced below the plane of the tops of the ribs, preparing a second metal slab with grooves conformed in location with the said ribs and with contact land areas laterally outside the grooves, said ribs and grooves having beveled side walls above the level of the anti-welding material for conforming contact and engagement with the ribs filling the grooves, bringing the slabs together so that the ribs are received in the grooves, and heating and exerting forces upon the outer surfaces of the slabs for effecting welding of the slabs at the surfaces of the ribs and grooves and at said land areas.

3. The method of producing a strip having its wider surfaces provided by metal laminations, with a layer of anti-welding material between said laminations and with the laminations integrally connected at the edges of said layer, which comprises milling a first metal slab to provide a longitudinal channel of predetermined width and depth, and with the channel bounded by lateral wall surfaces substantially at right angles to the channel floor, said lateral wall surfaces being joined to upwardly extending beveled surfaces slanting away from the channel, placing an anti-welding material in the channel to the level of said lateral wall surfaces so that the beveled surfaces extend thereabove, preparing a second metal slab with beveled surfaces for conforming to the beveled surfaces of the first slab and with a first longitudinal metal surface area between said beveled surfaces for contacting the anti-welding material, said slabs having second surface areas laterally outside said beveled surfaces for contact when said first surface area is in contact with the anti-welding material, bringing the slabs together so that said beveled surfaces and said second surface areas respectively engage, and hot rolling the slabs for effecting roll welding at said beveled surfaces and said second surface areas.

4. The method as in claim 3, in which at least two longitudinal channels are milled in the first slab with intermediate rib means therebetween, and each channel is filled with anti-welding material, said intermediate rib means extending above the anti-welding material, and the second slab has groove means for receiving said intermediate rib means, the parts of the intermediate rib means above the anti-welding material having convergently beveled walls and the latter said groove means having beveled walls conforming thereto, said rib means filling said groove means when the slabs are brought together.

5. The method of producing a laminate strip having metal laminations separated by a layer of anti-welding material with the laminations integrally joined metal-to-metal along the longitudinal edges of said layer, which comprises preparing two metal bodies, at least one said body having a longitudinal channel, the bodies having interengaging longitudinal ribs on said one body and grooves on the other of said bodies at areas outside said channel, and contact land areas laterally outside the ribs and grooves, filling said channel with a porous extensible anti-welding material to a level below the top of said ribs, bringing the bodies together with said interengaging ribs and grooves in contact with the ribs filling the grooves, welding the bodies together along the longitudinal edges, securing to the ends of the bodies closing members having holes therein alined with the said channel, hot rolling the edge-welded bodies as a billet whereby the surfaces of the interengaging ribs and grooves and the contact land areas are welded together and air is expelled through the holes, and continuing the rolling for extending the bodies and the anti-welding material and thereby producing the laminate strip.

6. A billet for producing a strip having its wider surfaces provided by metal laminations with a layer of anti-welding material therebetween and with the laminations integrally connected along the longitudinal edges of said layer, comprising two superposed metal bodies having welded connections along their longitudinal edges, the lower of said bodies having a longitudinal channel in the surface thereof, said bodies having interengaging longitudinal ribs on one said body and grooves on the other of said bodies at areas outside said channel and having contacting land areas extending from the respective ribs and grooves at the sides thereof away from the said channel, an extensible anti-welding material in said channel, said lower body having longitudinal ribs extending along the lateral edges of the channel and having beveled surfaces above the level of the top of said material, said channel being closed by the upper of said bodies, said upper body having laterally spaced grooves for containing and being filled by said ribs, said grooves having beveled walls engaged with the beveled walls of the ribs for preventing migration of the anti-welding material to the regions of said land areas.

7. The method of producing a strip having its wider surfaces provided by metal laminations, with a layer of anti-welding material between said laminations and with the laminations integrally connected at the edges of said layer, which comprises milling a first metal slab to provide at least two longitudinal channels of predetermined depth and width with longitudinal ribs at each side of each channel and located at the longitudinal edges of the channels and between them, said ribs having walls extending substantially at right angles to the floors of the channels for determining said depth of the channels and having convergently beveled walls thereabove and having flat tops, said first slab having land areas between the side ribs and the respective adjacent edge of the first slab, filling the channels with a slurry of an anti-welding powder in a vaporizable liquid vehicle, evaporating the vehicle, dressing the surface of the deposited anti-welding material until the material has said predetermined depth with said ribs projecting above the surface of said material, cleaning the surfaces of the filled slab, forming a second slab with laterally spaced side and intermediate longitudinal grooves with beveled walls and flat bottoms conforming to said ribs for closely receiving said ribs and having land areas between the side grooves and the respective adjacent edge of the second slab, and superimposing said second slab on the dressed first slab with the walls of the ribs in contact with the walls of the respective grooves and with the land areas of the second slab in contact with the land areas of the first slab, and hot rolling the slabs for effecting roll-bonding of the contacting areas of the slabs.

References Cited in the file of this patent

UNITED STATES PATENTS

| | | |
|---|---|---|
| 491,480 | Green | Feb. 7, 1893 |
| 1,723,659 | Rosenqvist | Aug. 6, 1929 |
| 1,765,368 | Frahm et al. | June 24, 1930 |
| 1,938,633 | Maskrey | Dec. 12, 1933 |
| 2,498,275 | Johnson | Feb. 21, 1950 |
| 2,759,246 | Campbell | Aug. 21, 1956 |
| 2,828,533 | Fromson | Apr. 1, 1958 |
| 2,906,006 | Neel | Sept. 29, 1959 |
| 2,961,761 | Watson et al. | Nov. 29, 1960 |
| 2,982,012 | Wilkins et al. | May 2, 1961 |
| 2,983,994 | Johnson | May 16, 1961 |

FOREIGN PATENTS

| | | |
|---|---|---|
| 116,061 | U.S.S.R. | Dec. 25, 1957 |